(12) United States Patent
Monica

(10) Patent No.: US 12,370,847 B2
(45) Date of Patent: Jul. 29, 2025

(54) ALIGNABLE ARTICULATING HITCH ASSEMBLY

(71) Applicant: Wade Monica, Mishawaka, IN (US)

(72) Inventor: Wade Monica, Mishawaka, IN (US)

(*) Notice: Subject to any disclaimer, the term of this patent is extended or adjusted under 35 U.S.C. 154(b) by 667 days.

(21) Appl. No.: 17/804,144

(22) Filed: May 26, 2022

(65) Prior Publication Data
US 2023/0406052 A1 Dec. 21, 2023

(51) Int. Cl.
B60D 1/44 (2006.01)
B60D 1/06 (2006.01)
B60D 1/167 (2006.01)

(52) U.S. Cl.
CPC .............. B60D 1/44 (2013.01); B60D 1/065 (2013.01)

(58) Field of Classification Search
CPC . B60D 1/065; B60D 1/44; B60D 1/36; B60D 1/40; B60D 1/1675; B60D 1/167
USPC ...................... 280/498, 477, 478.1
See application file for complete search history.

(56) References Cited

U.S. PATENT DOCUMENTS

| | | | | |
|---|---|---|---|---|
| 3,397,900 A * | 8/1968 | Sturges | ................ | B60D 1/40 280/486 |
| 3,979,138 A * | 9/1976 | George | ................ | B60D 1/40 280/491.3 |
| 4,073,508 A * | 2/1978 | George | ................ | B60D 1/40 280/491.3 |
| 4,976,453 A * | 12/1990 | Kaplan | ................ | B60D 1/40 280/479.2 |
| 4,978,134 A * | 12/1990 | Dahl | ................ | B60D 1/54 280/498 |
| 5,518,159 A * | 5/1996 | DeGuevara | ................ | B60R 9/06 224/512 |
| 5,547,210 A * | 8/1996 | Dugger | ................ | B60D 1/36 280/479.2 |
| 6,170,852 B1 * | 1/2001 | Kimbrough | ................ | B62D 53/00 280/479.2 |
| 8,256,790 B2 * | 9/2012 | Fortner | ................ | B60D 1/06 280/490.1 |
| 2015/0203049 A1 * | 7/2015 | Eichmann | ................ | B60R 9/06 224/509 |
| 2016/0129847 A1 * | 5/2016 | Mehlen | ................ | B60D 1/58 224/509 |

FOREIGN PATENT DOCUMENTS

CA          1179183 A  * 12/1984  ............... B60D 1/40

* cited by examiner

Primary Examiner — Anne Marie M Boehler
(74) Attorney, Agent, or Firm — Botkin & Hall, LLP; Michael D. Marston

(57) ABSTRACT

An articulating hitch is fitted to a standard receiver on a towing vehicle, with the hitch having a fixed portion mating with the towing vehicle receiver, the hitch is capable of being unlocked or locked. In the unlocked position, an intermediate link and ball mount link can be pivoted with respect to the fixed portion to allow a trailer to be connected without having to exactly locate the trailer. The ball mount link can receive a hitch ball to couple the trailer. In the unlocked position, the hitch ball can be moved and coupled to an adjacent trailer. Once coupled, the vehicle and trailer are brought together to collapse the mechanism where it can be locked. The vehicle can tow normally in the locked position.

12 Claims, 5 Drawing Sheets

ALIGNABLE ARTICULATING HITCH ASSEMBLY

BACKGROUND OF THE INVENTION

This present disclosure relates to towing and the coupling of a trailer to a towing vehicle. One of the most difficult steps in attaching a trailer to a vehicle is to get the alignment of the trailer coupler to the hitch ball on the vehicle. If the alignment isn't correct, the user risks damaging their vehicle or trailer when the trailer coupler contacts a bumper or other part. Others have attempted to solve this problem with retraction systems such as U.S. Pat. No. 8,240,694, but these require a specific device to be attached to a trailer. This device requires particular components on the towing vehicle and the trailer. In the cases where the trailer is on loan, this device could not be used. Other devices involve a complex mechanism as part of the towing vehicle, such as U.S. Pat. No. 10,821,790. Complex mechanisms can be expensive and problematic, particularly when not used for a long period of time and/or exposed to corrosive environments such as seawater or road salt. Others can be attached to a standard towing vehicle and do not require modification or special components on the trailer, but can significantly increase the distance between the towing vehicle and trailer, such as U.S. Pat. No. 10,875,369. An improved trailer alignment and coupling device is needed.

SUMMARY OF THE INVENTION

The present disclosure describes a drawbar hitch assembly that can be secured to a standard vehicle's receiver and be attached to a standard trailer through a ball hitch. The drawbar hitch assembly has a fixed portion with a drawbar for being affixed to a vehicle receiver. The fixed portion has a side stop extending therefrom with a stop surface offset from a fixed axis. The fixed portion has a locking bar with an upper locking aperture offset from the fixed axis. The fixed portion has an aperture to receive a first pivot. The drawbar hitch assembly has an elongate intermediate link with a first pivot aperture located on a proximal end and a second pivot aperture located on a distal end. The intermediate link can pivot with respect to the fixed portion on a first pivot axis. The first pivot axis extends through the first pivot aperture and the aperture on said fixed portion. The intermediate link has a locking bar that has a lower locking aperture. The drawbar hitch assembly has a ball mount link with a ball mount pivot aperture. The ball mount link can pivot with respect to the intermediate link on a second pivot axis. The second pivot axis extends through the second pivot aperture and the ball mount pivot aperture. The ball mount link has a center locking aperture. The ball mount link has a tongue portion affixed thereto and having a tongue axis. The drawbar hitch assembly has a removable locking pin for being received by the locking apertures on the fixed portion, intermediate link, and ball mount link. When the locking pin extends through the locking apertures, the ball mount link and intermediate link are fixed with respect to the fixed portion.

When the locking pin is removed, the ball mount can be articulated away from the fixed portion in order to bring a hitch ball closer to a trailer. Once the hitch ball is coupled, the vehicle is backed towards the trailer, causing the linkage to fold back to a collapsed position. The user then reinstalls the locking pin to tow the trailer normally.

DESCRIPTION OF THE PREFERRED EMBODIMENT

Figure 1:
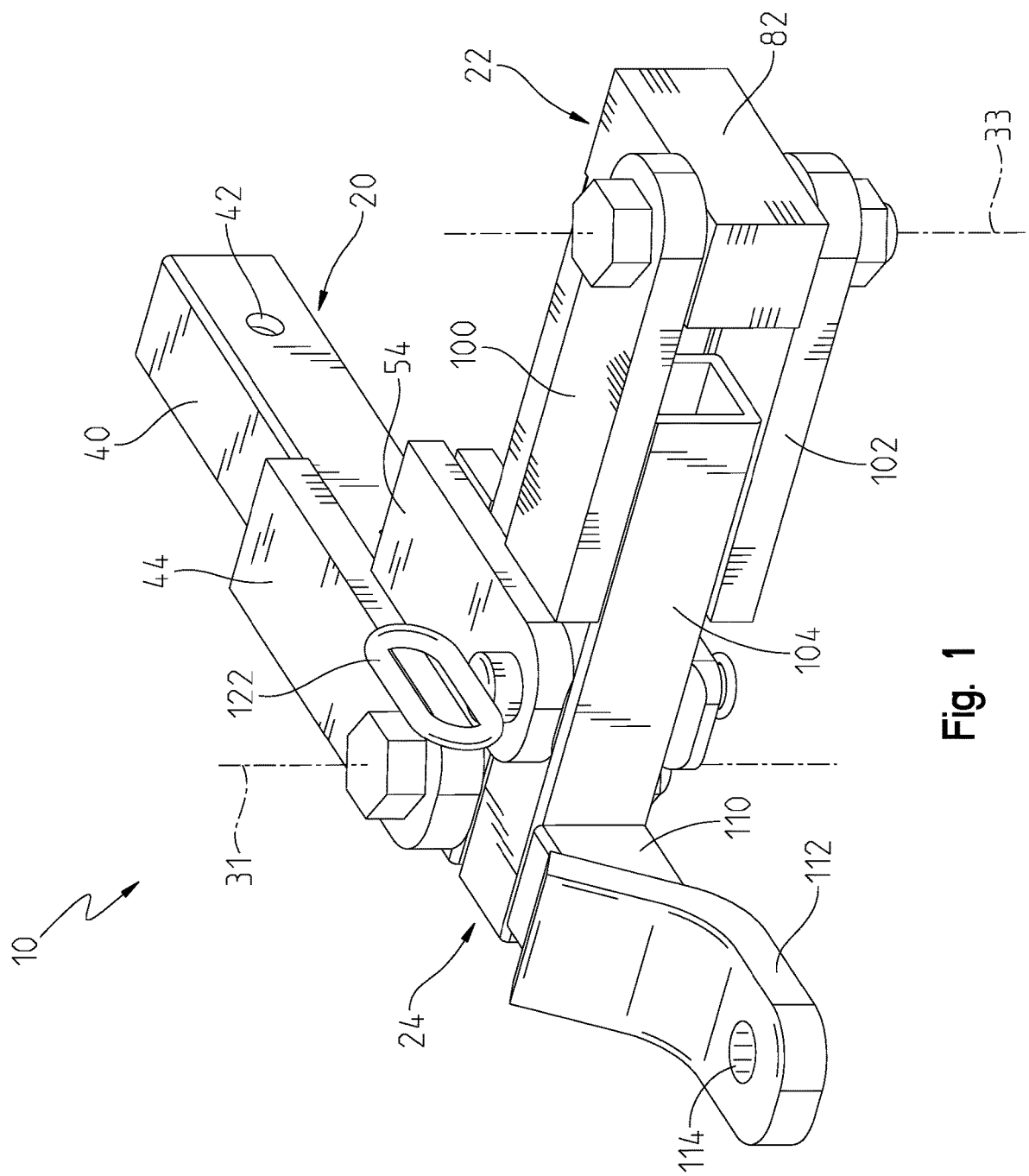
FIG. 1 is a front isometric view of the hitch assembly in the locked and stowed position.
Figure 2:
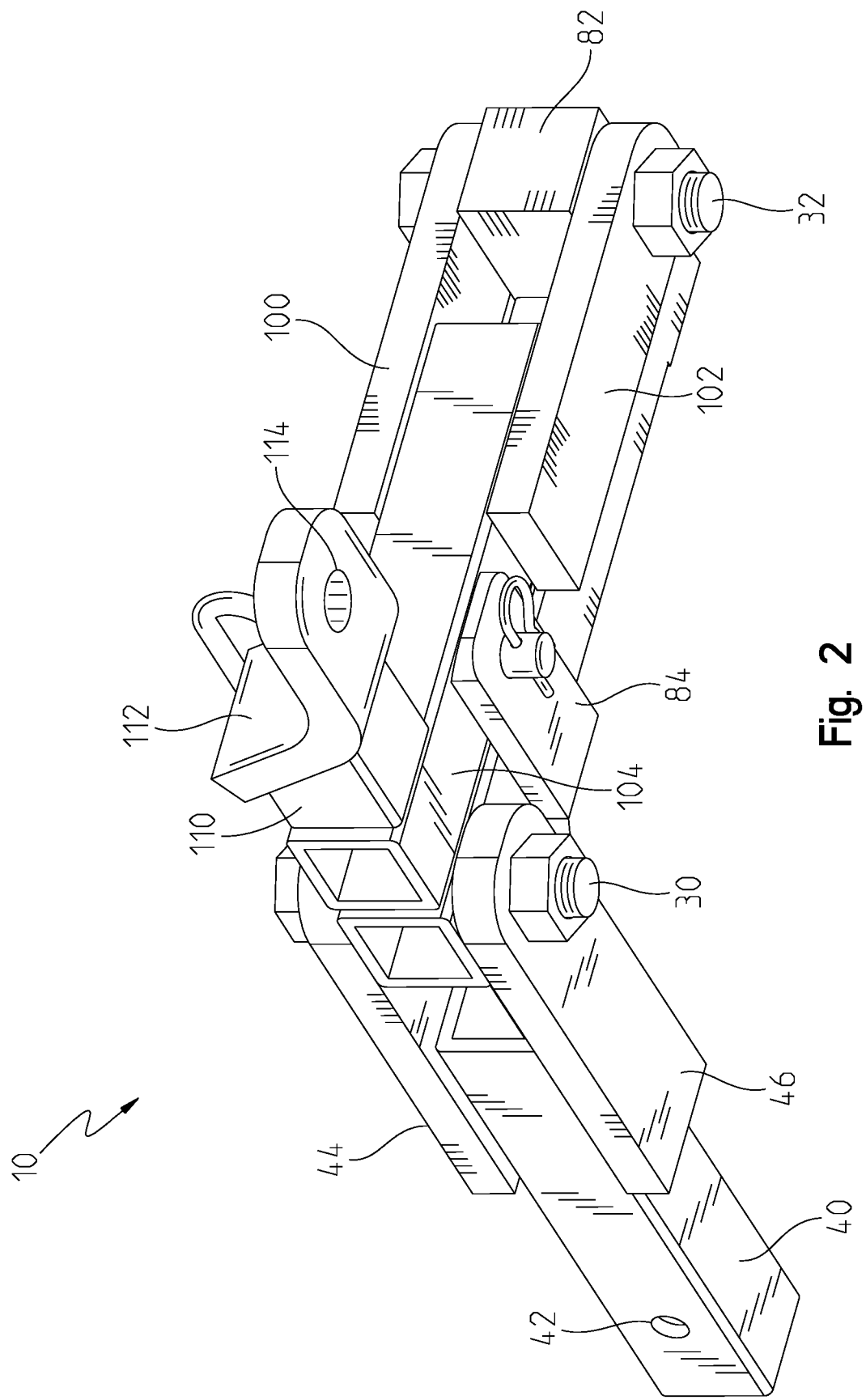
FIG. 2 is a bottom isometric view of the hitch assembly in FIG. 1.
Figure 3:
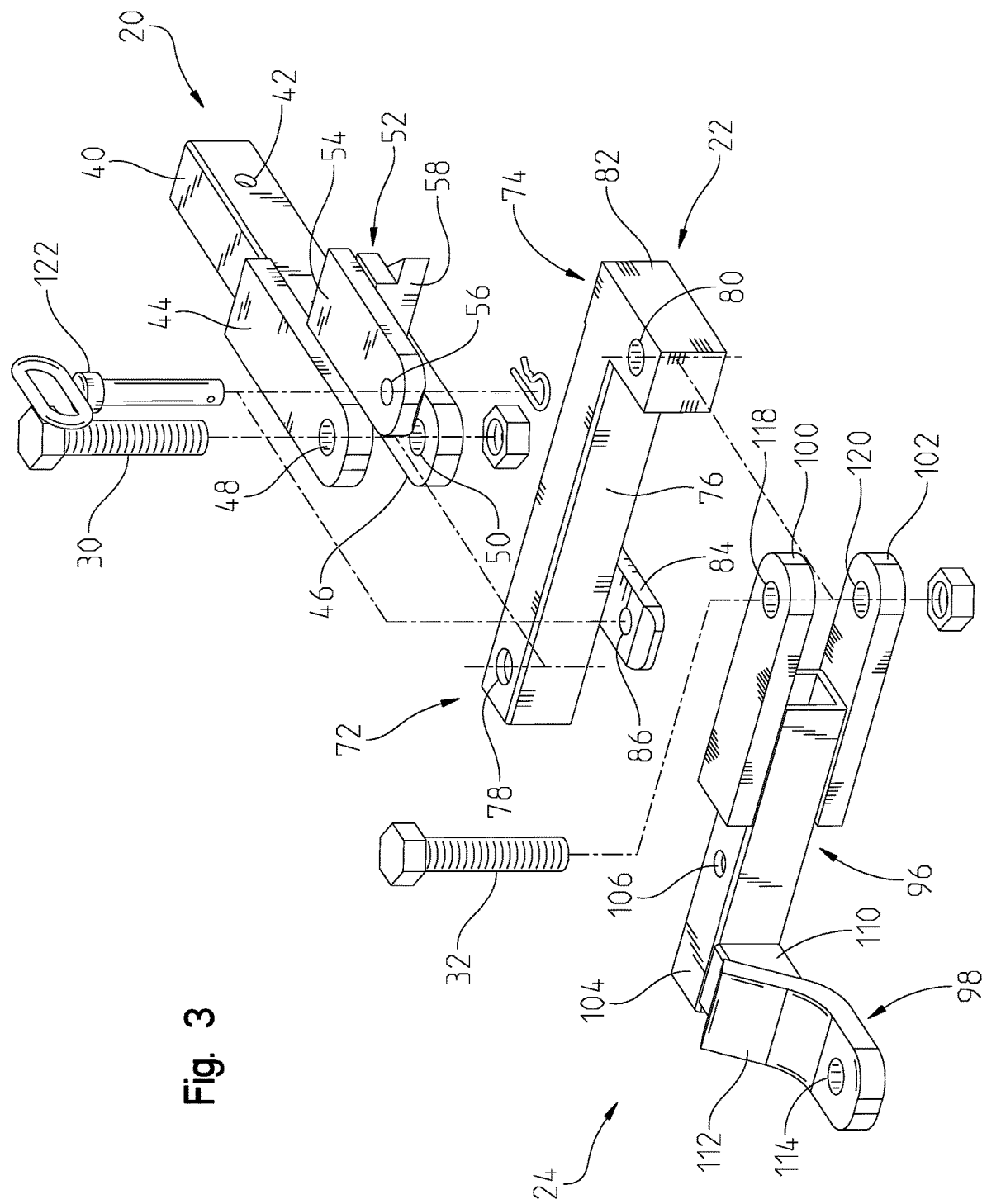
FIG. 3 is an exploded isometric view of the hitch assembly in FIG. 1.
Figure 4:
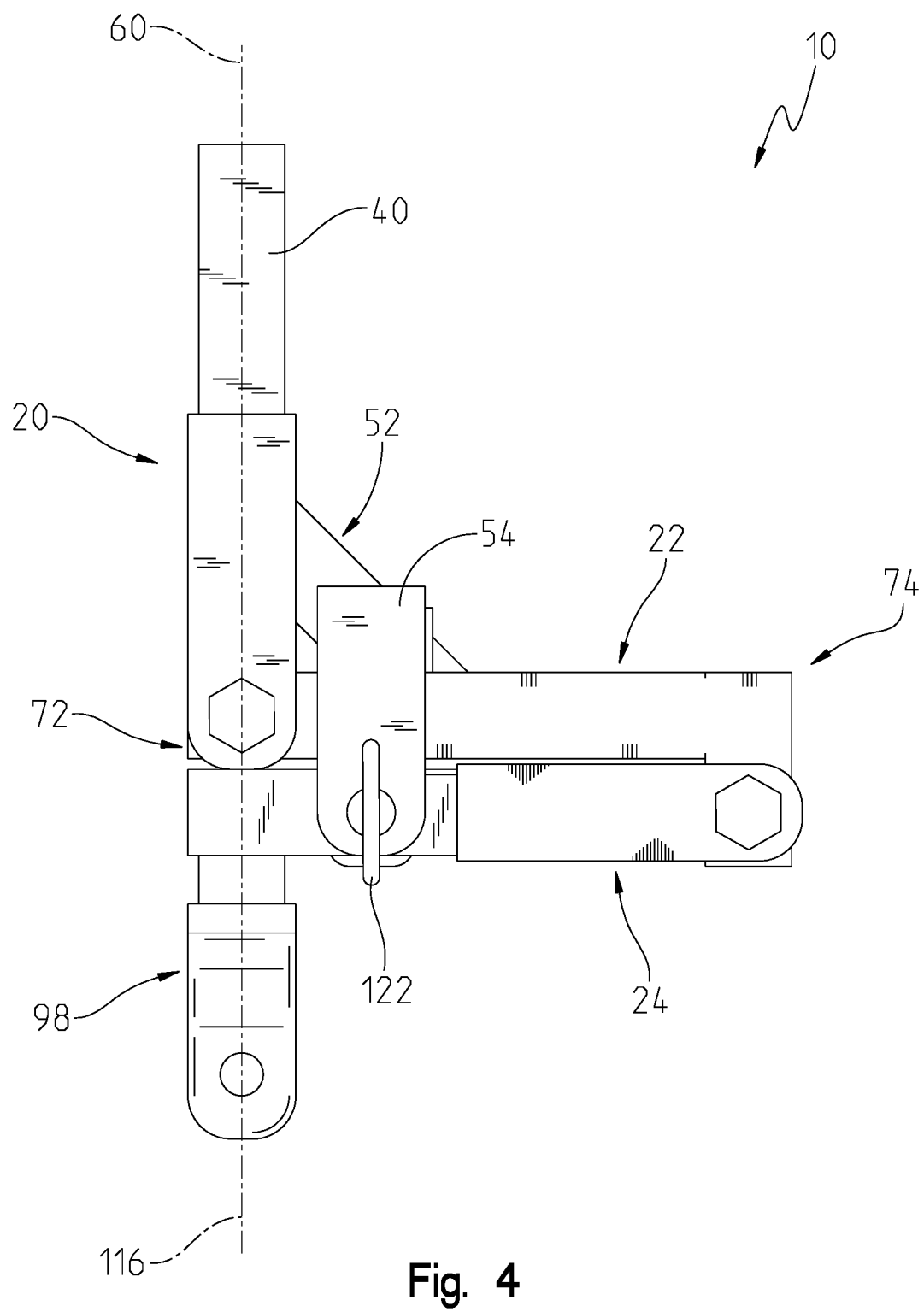
FIG. 4 is a top view of the hitch assembly in FIG. 1.
Figure 5:
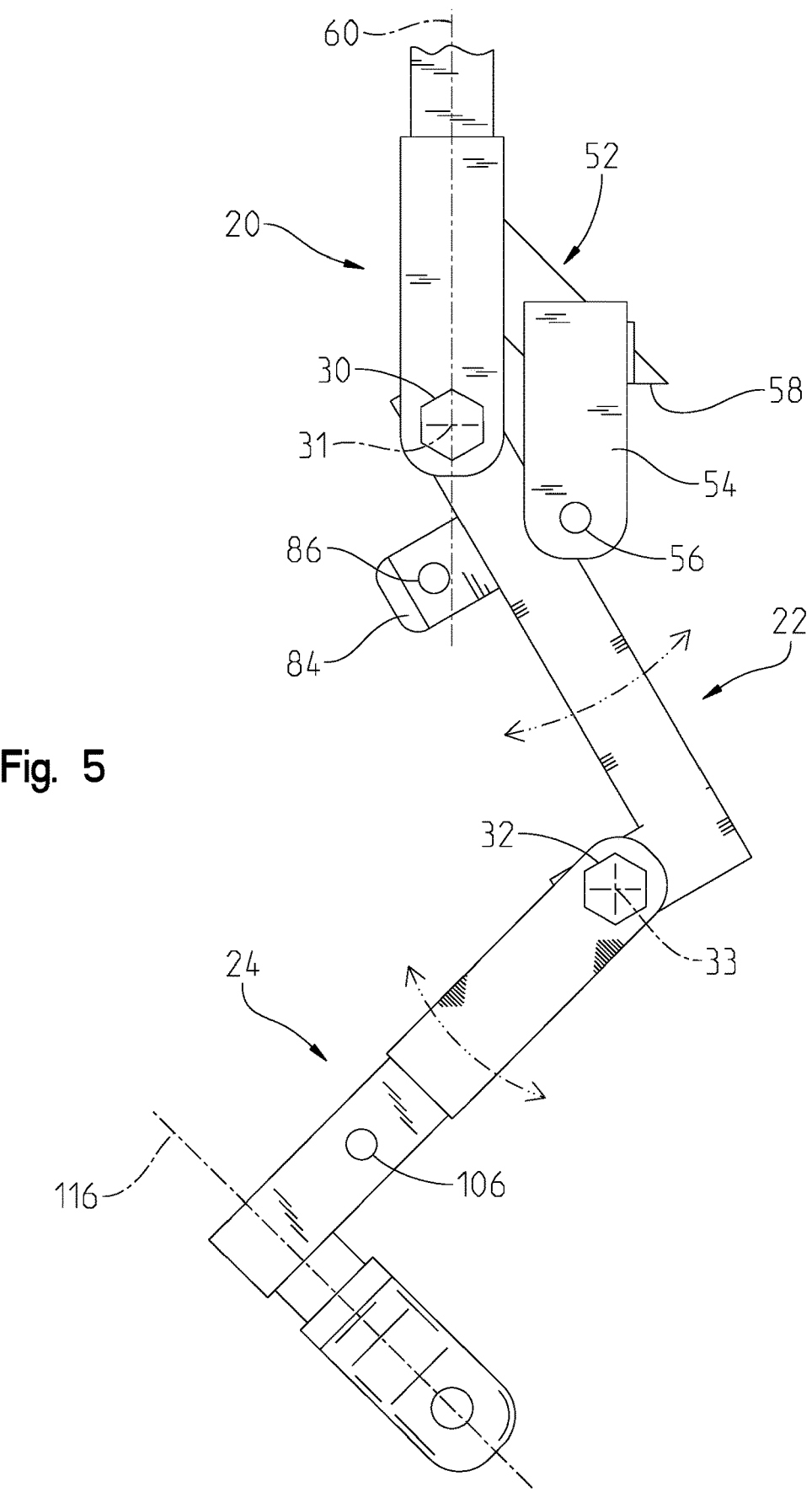
FIG. 5 is a top view of the hitch assembly in the unlocked position and articulated away from the stowed position.

An articulating hitch assembly 10 is shown in FIGS. 1-5 and designed to be affixed to a receiver on a towing vehicle (not shown). The hitch assembly 10 has a fixed portion 20, an intermediate link 22, and a ball mount link 24. As shown in FIG. 5, the fixed portion 20 is coupled to the intermediate link 22 at a first pivot 30 and the intermediate link 22 is coupled to the ball mount link 24 at a second pivot 32. The hitch assembly 10 can be either locked/stowed as shown in FIGS. 1-2 and 4 or unlocked/articulating as shown in FIG. 5. When unlocked, the intermediate link 22 can pivot with respect to the fixed portion 20 on a first pivot axis 31 and the ball mount link 24 can pivot with respect to the intermediate link 22 on a second pivot axis 33. The hitch assembly 10 is locked in most situations, such as when it is being used for towing. The hitch assembly 10 can be unlocked so it can articulate and allow the user to move the hitch ball (not shown but attached at ball mount aperture 114) with the limits of the mechanism to align it to an adjacent trailer coupler (not shown). Once coupled to a trailer, the user moves the trailer and vehicle closer together, by either backing the vehicle up or moving the trailer forward, which articulates the links 22, 24 and brings the ball mount link 24 in contact with the fixed portion 20, otherwise known as the stowed position. The assembly 10 can only be locked in the stowed position. Locking is accomplished with a locking pin 122.

Turning now to the components of the hitch assembly 10, the fixed portion 20 has a drawbar 40 with a transverse hole 42 that is sized to fit into and be secured to a vehicle's receiver. As shown, the drawbar 40 is a square tube that fits popular vehicle-mounted square receivers but can be adapted to fit other vehicle or towing mounts. An upper plate 44 and lower plate 46 are affixed to the drawbar 40 and each has an aperture 48, 50 that align to form the first pivot 30. The first pivot 30 is shown as a bolt, but could be a pin, hinge, clevis, or other structure that allows pivoting about the first pivot axis 31. A side stop 52 is affixed to the side of the drawbar 40. Affixed to the side stop 52 is a top locking bar 54 that has an upper locking aperture 56. The side stop 52 has a stop surface 58 that can contact the intermediate link 22 in the stowed position. As shown in FIG. 5, the top locking bar 54 is offset from the first pivot 30 and drawbar 40. The fixed portion 20 has a fixed axis 60 that is centrally located and extends through the first pivot to intersect the first pivot axis 31. The designations of upper, lower, left, right, top, bottom, and the like are for identification of parts and not in any way intended to limit the locations or orientation of components.

The intermediate link 22 is an elongate member with the first pivot aperture 78 located at a proximal end 72 and the second pivot aperture 80 located at a distal end 74. When the assembly 10 is unlocked, the intermediate link 22 can pivot with respect to the fixed portion between a parked position defined by the intermediate link 22 contacting the stop surface 58 on the fixed portion 20 (shown in FIG. 4) and a limit position when rotation of the intermediate link 22 is limited by the vehicle or a second stop on the fixed portion 20. The second pivot 32 is shown as a bolt, but could be a pin, hinge, clevis, or other structure that allows pivoting about the second pivot axis 33. As shown, the intermediate link 22 has a tube 76 and a pivot block 82 that is affixed thereto. The pivot block 82 is located at the distal end 74 and extends orthogonally from the intermediate link 22. As shown, the pivot block 82 is fixed with respect to the tube 76, but it is contemplated that the second pivot 32 is located in line with the tube 76 and the pivot block 82 can pivot. It is further contemplated that the ball mount link 24 pivots with respect to the intermediate link 22 without the need of a pivot block 82. A bottom locking bar 84 is affixed to the intermediate link 22 and has a lower locking aperture 86. As shown, the tube 76 is a hollow square tube and pivot block 82 is shown as solid, but it is contemplated that other components or shapes are used for construction. The second pivot 32 is offset from the tube 76.

The ball mount link 24 is attached to the intermediate link 22 at the second pivot 32. When the assembly 10 is unlocked, the ball mount link 24 can pivot with respect to the intermediate link 22 between a parked position defined by the ball mount link 24 in contact with and parallel to the intermediate link 22 (shown in FIG. 4) and a limit position when rotation of the ball mount link is limited by the vehicle or a third stop. As with the fixed portion 20 and intermediate link 22, the ball mount link 24 is shown as constructed from square tubing and plates, but other components are contemplated. The ball mount link 24 has an elongate portion 96 and a tongue portion 98 that extends perpendicularly therefrom. The elongate portion 96 has plates 100, 102 that are affixed to a tube 104 and have ball mount pivot apertures 118, 120. The tube 104 has a center locking aperture 106 located between the second pivot 32 and tongue portion 98. The tongue portion 98 is affixed to the elongate portion 96 and is formed from a short length of square tubing 110 and a ball mount plate 112. The tongue portion 98 has a tongue axis 116 that extends along its length. It is contemplated that the ball mount plate 112 is affixed directly to the elongate portion. The ball mount plate 112 has a ball mount aperture 114 for affixing a hitch ball.

Now that the main components are described, the use of the assembly 10 along with the interaction and relationship of the fixed portion 20, intermediate link 22, and ball mount link 24 will be described. As previously described, the assembly 10 can be either locked as shown in FIG. 4 or unlocked and articulating as shown in FIG. 5. In normal use, the assembly 10 is locked, where the links 22, 24 are fixed with respect to the fixed portion 20 and the fixed axis 60 is aligned with the tongue axis 116. A locking pin 122 extends through the upper locking aperture 56, the center locking aperture 106, and the lower locking aperture 86. It is contemplated that there is no center locking aperture 106 and the top locking bar 54 and bottom locking bar 84 extend further than what is shown so that the locking pin 122 traps the intermediate link 22 between the stop surface 58 and the locking pin 122. In the locked position, the elongate portion 96 is adjacent to and parallel to the intermediate link 22 and the tongue portion 96 is aligned with the fixed portion 20. To unlock the assembly 10, the user pulls the locking pin 122, which frees up the intermediate link 22 and ball mount link 24. When the user wants to connect a trailer to the towing vehicle, they unlock the assembly and bring the trailer close to the assembly 10. If necessary, the user then raises the height of the trailer coupler and articulates the hitch ball into alignment underneath the trailer coupler. The user then lowers the trailer coupler onto the hitch ball and locks the trailer coupler to the ball. At that point, the assembly 10 is still unlocked and allowed to move. A second stop and third stop can be included to prevent over extension of the assembly 10. Over extension of the assembly 10 could prevent the links 22, 24 from properly folding to the stowed position as the trailer and vehicle are brought closer together. For example, if the intermediate link 22 is moved beyond a point where the second pivot axis 33 crosses the fixed axis 60, attempts to move the assembly 10 to the stowed position could result in the intermediate link 22 not naturally returning to the position where it contacts the stop surface 58. The user then brings the trailer and vehicle closer together, either by moving the trailer forward or reversing the vehicle. This brings the intermediate link 22 into contact with the stop surface 58 and the ball mount link 24 into contact with the intermediate link 22. At this point, the fixed axis 60 is aligned with the tongue axis 116 as shown in FIG. 4. Because the lower locking aperture 86 is on the intermediate link 22 and the upper locking aperture 56 is affixed to the fixed portion 20, the center locking aperture 106 only lines up with the other locking apertures 56, 86 when the assembly 10 is fully collapsed, shown in FIG. 4. The user then reinstalls the locking pin 122, locking the assembly 10 and allowing the trailer to be towed normally.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An alignable articulating hitch assembly comprising:
   a fixed portion having a drawbar for being affixed to a vehicle receiver, said fixed portion having a side stop extending therefrom, said side stop having a stop surface offset from a fixed axis aligned with said drawbar, said fixed portion having a locking bar affixed thereto and having an upper locking aperture offset from said fixed axis;
   an intermediate link pivotable with respect to said fixed portion on a first pivot axis, said intermediate link having a locking bar affixed thereto, said locking bar of said intermediate link having a lower locking aperture;
   a ball mount link pivotable with respect to said intermediate link on a second pivot axis, said ball mount link having a center locking aperture, said ball mount link having a tongue portion affixed thereto and having a tongue axis aligned with said tongue portion;
   a removable locking pin for being received by said locking apertures; and
   when said locking pin extends through said upper locking aperture, said lower locking aperture, and said center locking aperture, said ball mount link and said intermediate link fixed with respect to said fixed portion.

2. The alignable articulating hitch of claim 1, wherein said intermediate link contacts said stop surface when said locking pin extends through said upper locking aperture, said lower locking aperture, and said center locking aperture.

3. The alignable articulating hitch of claim 1, wherein said tongue axis is aligned with said fixed axis in said locked position.

4. The alignable articulating hitch of claim 1, wherein said second pivot axis is offset from an elongate portion of said intermediate link.

5. The alignable articulating hitch of claim 1, further comprising a second stop surface to limit rotation of said intermediate link with respect to said fixed portion and a third stop surface to limit rotation of said ball mount link with respect to said intermediate link.

6. The alignable articulating hitch of claim 1, wherein said first pivot axis is parallel to said second pivot axis.

7. An alignable articulating hitch assembly comprising:
- a fixed portion having a drawbar for being affixed to a vehicle receiver, said fixed portion having a side stop extending therefrom, said side stop having a stop surface offset from a fixed axis aligned with said draw bar, said fixed portion having a locking bar affixed thereto and having an upper locking aperture offset from said fixed axis, said fixed portion having an aperture to receive a first pivot;
- an elongate intermediate link having a first pivot aperture located on a proximal end and a second pivot aperture located on a distal end, said intermediate link pivotable with respect to said fixed portion on a first pivot axis, said first pivot axis extending through said first pivot aperture and said aperture on said fixed portion, said intermediate link having a locking bar affixed thereto, said locking bar of said intermediate link having a lower locking aperture;
- a ball mount link having a ball mount pivot aperture, said ball mount link pivotable with respect to said intermediate link on a second pivot axis, said second pivot axis extending through said second pivot aperture and said ball mount pivot aperture, said ball mount link having a center locking aperture, said ball mount link having a tongue portion affixed thereto and having a tongue axis;
- a removable locking pin for being received by said locking apertures; and
- when said locking pin extends through said upper locking aperture, said lower locking aperture, and said center locking aperture, said ball mount link and said intermediate link are fixed with respect to said fixed portion.

8. The alignable articulating hitch of claim 7, wherein said intermediate link contacts said stop surface when said locking pin extends through said upper locking aperture, said lower locking aperture, and said center locking aperture.

9. The alignable articulating hitch of claim 7, wherein said tongue axis is aligned with said fixed axis in said locked position.

10. The alignable articulating hitch of claim 7, wherein said second pivot axis is offset from an elongate portion of said intermediate link.

11. The alignable articulating hitch of claim 7, further comprising a second stop surface to limit rotation of said intermediate link with respect to said fixed portion and a third stop surface to limit rotation of said ball mount link with respect to said intermediate link.

12. The alignable articulating hitch of claim 7, wherein said first pivot axis is parallel to said second pivot axis.

* * * * *